UNITED STATES PATENT OFFICE.

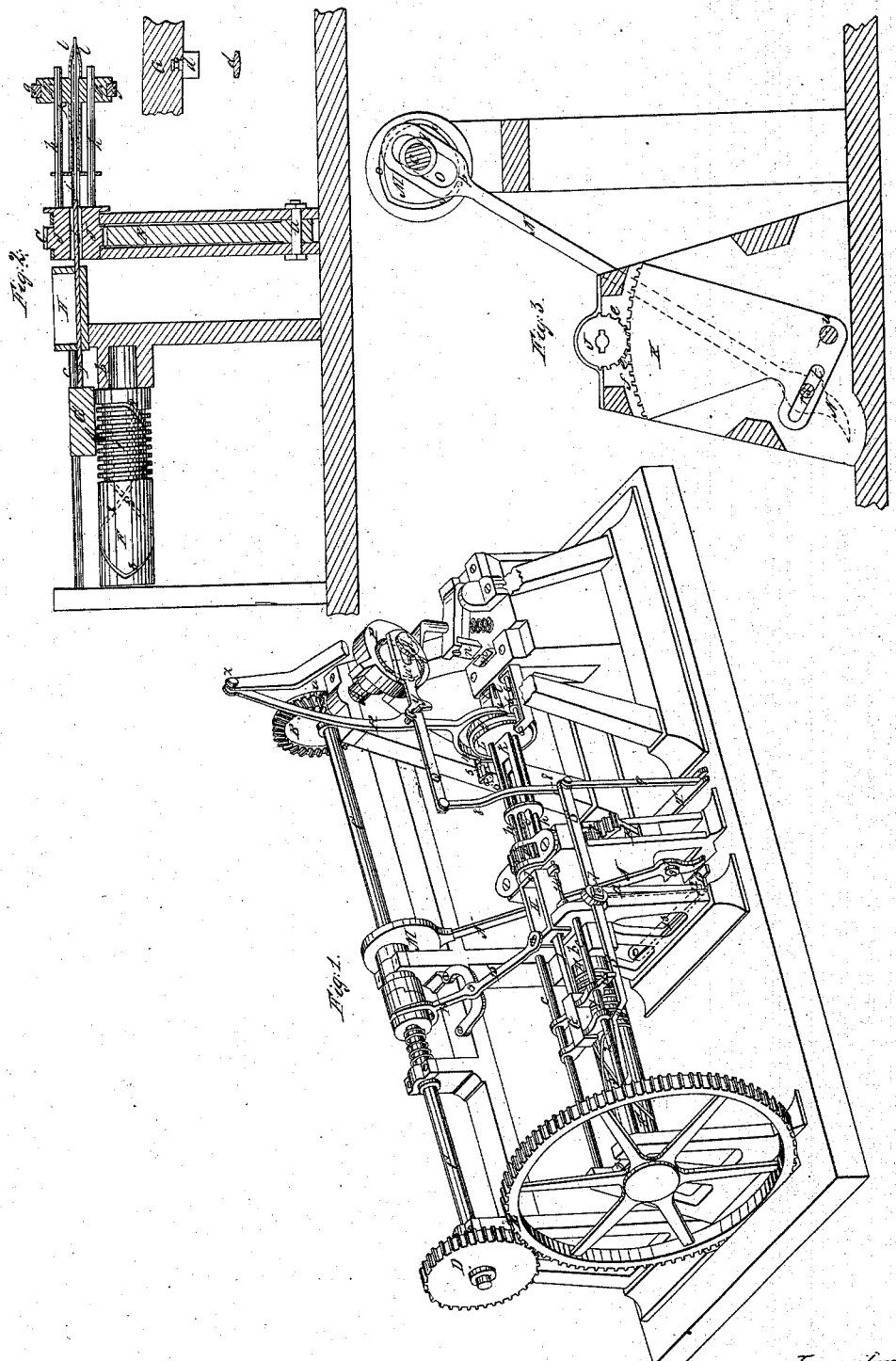
J. Newell,
Making Cut Nails,
№ 26,513. Patented Dec. 20, 1859.
Witnesses:
Inventor:
John Newell

JOHN NEWELL, OF LOWELL, MASSACHUSETTS.

NAIL-PLATE FEEDER.

Specification of Letters Patent No. 26,513, dated December 20, 1859.

*To all whom it may concern:*

Be it known that I, JOHN NEWELL, of Lowell, in the county of Middlesex and State of Massachusetts, have invented a new and useful Improvement in Automatic Nail-Plate Feeders; and I do hereby declare the following to be a full, clear, and exact description of the construction and operation of the same, reference being had to the accompanying drawings, making a part of this specification, in which—

Figure 1, represents a perspective view of the machine. Fig. 2, represents a vertical section through a portion of the same, and Fig. 3, represents a transverse section thereof.

Similar letters of reference where they occur in the several figures, denote like parts of the apparatus in all the figures.

My invention relates to an automatic nail-plate feeder that takes the lower one of a pile of plates previously deposited in a magazine, feeds it up regularly to the cutters, and returns for the next one of the series of plates, and automatically throwing the sheath that revolves the nail plate into and out of action as the case may be, and as will be hereinafter explained.

To enable those skilled in the art to make and use my invention I will proceed to describe the same with reference to the drawings.

Motion may be communicated through the shaft A, to the feeding apparatus through a crank, gearing or belts from any first moving power. On one end of this shaft A, there is a bevel pinion *a* which gears with and turns a bevel gear wheel B, on the shaft C, thus giving motion also to said shaft C. The opposite end of the shaft C, from that carrying the bevel gear B, has upon it a cog wheel D, that gears with a larger cog wheel E on the end of a screw shaft F, that is turned thereby in its bearings or boxes *b*, *b*. Parallel with this screw shaft F, and slightly above it, are two ways or rods *c*, *c*, upon which a carriage G traverses, as follows: On the underside of the carriage there is a pivoted switch *d*, Fig. 2, which follows the course of the female threads or grooves 1, 2, 3, in the screw shaft F. It is necessary that the switch should be pivoted, so that it may adapt itself to, and follow, the threads or grooves, which differ in their pitch and direction, in order to give the carriage all its necessary movements. When the switch *d*, is in the grooves 1, the carriage is being regularly fed up toward the cutters at a slow but uniform speed sufficient to feed it forward the width of a nail, at each operation of the cutters. But when the switch arrives at the end of the regular groove 1, which takes place just as the nail plate is fed entirely up and exhausted, then the switch turning upon its pivot takes into the long or steep pitched groove 2 (Fig. 2) and runs the carriage rapidly back on its ways to the extremity of its traverse movement, and at this point the groove 2, turns and runs into the one 3, which of course the switch continues to follow, carrying forward the carriage G, with the same rapid motion until the groove 3, runs into the regular groove 1 again, and then the carriage is again advanced with its regular feeding motion.

H, is a magazine capable of holding some twenty, thirty, or more nail plates piled up in it, one lying upon the other. The end of the carriage next this magazine carries a feeding bar or driver I, which extends into, and at times through, said magazine; and this bar may be of an I form, its flanges moving in grooves so as to prevent it from rising, and direct it generally in its movements—and in height this driver should be a little less than the thickness of the nail plates so as to be certain of only touching or coming in contact with the lower plate of the pile. Its duties are as follows: Suppose a supply of plates to be in the magazine, and that a nail plate has just been fed up to the cutter. The carriage and the driver is rapidly run back, until the forward end of the driver comes in rear of the pile of plates, the plates instantly drop, and the driver is as instantly on its quick forward motion carrying the under plate of the series into the sheath, and when it arrives there the switch takes the slow threads or grooves, and the slow feed begins, and continues until the plate is worked up, and then the carriage returns for the next succeeding similar operation.

In advance of the magazine H, there is a hub J, supported in bearings in which it can freely turn or rock, for it has a reciprocating rotary motion; and a portion of the perimeter of this hub has cogs *e* upon it with which the cogs *f*, on the segment wheel K work, and through which it receives its motion, while the center of said hub is slotted to allow the driver I, as well as the nail plate it is carrying forward, to freely pass through it when it is momentarily at rest. To this hub J, and to a similarly revolving disk L, supported by, and turning in, a ring *g*, are connected respectively the rear and front ends of the rods *h, h,* sheath rods *i i,* and outer sheath case *k,* as follows: The rods *h, h,* and sheath rods *i i,* are permanently fastened to the hub J, and of course turn with it, and the outer sheath case *k,* is permanently attached to the disk L, but made to slide over the sheath rods when the disk L approaches the hub J, which it does every time the plate is to be turned over and fed up. Forward of the disk this outer case or sheath forms the jaws *l l,* in which the plate is controlled or held by spring pressure and through which it is gradually projected at each feed motion to afford sufficient to form the nail.

To show more clearly the operation of the entire machine, I have arranged the cutters *m, n,* on the same frame with the nail plate feeder. In practice such will not be the case, as it may be necessary to adjust the feeder to the cutters, or to change the former when different sized nails are to be made, and the arrangement of the cutters as herein shown, is merely for illustration.

On the shaft C there is a cam wheel M, having a cam groove *o,* on one of its faces, in which a stud *p,* in the upper end of a connecting or hooked bar N works, said bar having a slot O, in its upper end to allow it to follow the throws or beats of the cam groove *o,* and said upper end of said bar N, is held up to the cam wheel by a collar *q* on the shaft C. The lower end of the rod N, has a hook *r,* upon it which catches over a wrist *s* that can be adjusted in a slot *t,* in the segment wheel K, and when adjusted, it is held there. The segment wheel is hung, or vibrates on a shaft or journals *u,* so that the motion given to the rod N, by the cam *o,* is imparted through said rod to the segment wheel K, and by the segment wheel to the hub J, and the nail plate in its case or sheath, each and every movement or rest being timed to suit the action of feeding—turning over, or furnishing a fresh nail plate.

There is also a cam wheel P, on the shaft A, having a cam groove *v,* in its face, in which a stud *w* works said stud being fastened to an arm Q, and giving to said arm, an extent of motion equivalent to the throw of said cam groove. This arm Q has a hook *x* in it which catches over a stud or pin *y* in the bail rod R, and vibrates said bail rod on its pivoted point *z*. This bail rod is forked at its lower end, so as to form a bail 4 that is connected to ears 5, on the sides of the ring *g,* said ears taking over rods or ways 6, and by this connection the disk, nail plate holder, &c., are fed to and from the cutters, for the purposes heretofore described.

When the carriage and driver is returning with a fresh nail plate, it is necessary that the hub J, should remain stationary and so that the opening through its center should be in the right position to allow the nail plate and driver to pass through it, as the plate must pass up into the sheath. To effect this result I provide as follows: A lever S, is pivoted at 7, and its forward end is connected to the arm Q, by a rod 8, and to a spring T, by another rod 9. The rear end of this lever has a bend 10 in it, which the arm 11 of the carriage G strikes, when it is running back preparatory to bringing up a new nail plate—and this arm continuing upon the higher portion of the lever, presses and holds down that end of said lever. There is also an arm 12, on the lever S, which projects downward, and into an opening in a hinged trigger 13. Now the effect of pressing down the rear end of the lever S, and holding it down is as follows: It raises up the hook *x,* clear of the pin *y,* and stops the motion of the disk L; it slips the trigger 13, under the point of the rod N, which raises the hook *r* in said rod from the wrist pin *s* in the segment wheel K, thus stopping the motion of said segment wheel and the parts also which it gives motion to, viz: the hub L, &c., and finally it strains up the spring T, and all these parts continue in this position until the carriage returns far enough to clear the lever S, of its arm 11, and the moment this is done the recoil of the spring T, brings the hook *x,* onto the pin *y,* and the hook *r,* onto the pin *s,* by withdrawing the trigger 13, from under the toe piece of the rod N, and motion is at once communicated to all the moving parts and thus continues until the nail plate is worked up and another one required. The only attendance the machine requires is to keep the magazine supplied with plates.

Should the driver at any time stick fast, or the plates get disarranged in the magazine so that either fails to perform its duty, the failure may be made available to throw the machine out of gear, and stop it at once, as the motion continued under such failure must break some part of the machine. To effect this, the magazine H may be placed on ways 14, but held thereon by springs, so as not under ordinary circumstances to move. But when a nail plate fails to leave the magazine, or the driver fails to properly pass into or through the magazine, the effect will be that the magazine will be forced along on its ways 14, and this motion through a clutch lever 15 will uncouple the shaft C, and consequently stop the feed motion of the driver.

The forward ends of the sheath rods *i i* are bent outward at their forward ends sufficiently to pass through slits in the outer sheath case, so that the end of a nail plate lying in the outer sheath case, can pass freely back within the sheath rods, without meeting any obstacle at its edges or sides, when moving backward with the outer sheath case.

The office of the sheath rods *i i* being to complete the passage way for the nail plates between the hub J and the sheath *k* at the time when the plate is passing out from the magazine into the sheath, these sheath rods may be dispensed with, provided a clamp be arranged in connection with the lever S so as to catch the bail rod R, or the sheath *k* at the backward end of their movement and hold them with the back end of the sheath near to the hub J, while the hook *x* is disconnected from the pin *y*; and provided the back end of the sheath be furnished with a spring which will allow the nail plates to pass forward into the sheath but not back again.

In order that the front end or jaws of the sheath may move forward near to the moving knife of the cutter when a nail is to be cut off, and so feed up nearly the whole plate with as little remnant or scrap as possible, the jaws *l l* may be made thin, relieving them from any strain from the action of the cutter on the nail plate, by what I call a strain bar, which is a bar or strap attached to the cutter-frame over the lower knife, in front of and near to the upper or moving knife, between which bar and the lower knife the jaws *l l* of the sheath will pass.

The magazine may be attached to the sheath and partake of all its movements, the plates being pressed toward the driver by springs, and the driver may be made to partake of part or all of these movements.

Instead of the magazine as shown in the drawing there may be used in connection with the automatic driver a revolving cylinder with its axis parallel to the driver or an apron capable of motion transversely with respect to the driver, or a table capable of the same transverse motion, either of which by periodical automatic movements, will present to the automatic driver a fresh nail plate, thus combining with the apparatus for feeding to the cutters, a magazine of plates not partaking of the rapid movements of the feed.

Having thus fully described the nature and object of my invention, what I claim therein as new and desire to secure by Letters Patent is—

1. In combination with a magazine for containing a pile of plates an automatic driver that takes the under plate of the pile, and feeds it up toward the cutters, in regular succession, substantially as herein described.

2. I also claim in combination with the automatic driver, the geared hub and segment, and hinged lever R, for turning and moving the nail plate to the driver and to the cutters, substantially as described.

3. I also claim in combination with the driver or the carriage to which it is connected, the lever S with its several connected parts, for throwing out and holding out of gear the feeding devices, while the driver is in the act of bringing up a fresh nail plate as set forth.

4. I also claim in combination with the feeding shaft F, and its grooves 1, 2, 3, the pivoted switch *d* on the carriage for the purpose of giving said carriage a rapid retreating and partial advanced motion and a slow feed motion substantially as set forth.

JOHN NEWELL.

Witnesses:
WM. P. WHEELER,
GEO. H. RICHARDS.